No. 859,037. PATENTED JULY 2, 1907.
G. A. BAHN.
APPARATUS FOR TESTING ERRORS OF REFRACTION.
APPLICATION FILED DEC. 26, 1906.
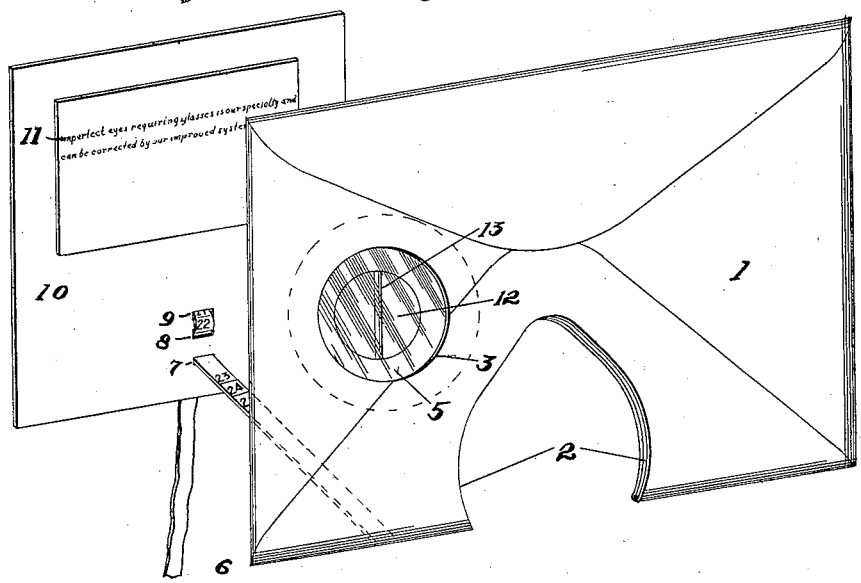
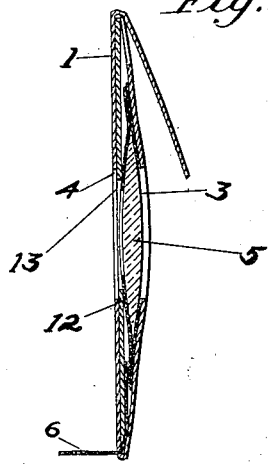
Witnesses:
Inventor:

UNITED STATES PATENT OFFICE.

GUSTAVUS ADOLPHUS BAHN, OF AUSTIN, TEXAS.

APPARATUS FOR TESTING ERRORS OF REFRACTION.

No. 859,037.  Specification of Letters Patent.  Patented July 2, 1907.

Application filed December 26, 1906. Serial No. 349,593.

*To all whom it may concern:*

Be it known that I, GUSTAVUS ADOLPHUS BAHN, a citizen of the United States of America, residing at Austin, in the county of Travis and State of Texas, have invented certain new and useful Improvements in Apparatus for Testing Errors of Refraction, of which the following is a full, clear, and exact description.

The object of my invention is to provide a simple device by which a person may readily and accurately test his eyes for hyperopia, myopia, presbyopia or astigmatism and it consists in certain novel features of the instrument illustrated in the accompanying drawings and hereinafter first fully described and then particularly pointed out in the claims.

In the said drawings, Figure 1 is a perspective view of the device arranged for use; Fig. 2 is a vertical transverse section taken through the lens, and Fig. 3 is a detail view of the scale or measure.

In carrying out my invention, I employ a case or envelop, 1, provided in its lower edge at its center with a notch, 2, properly shaped to fit the nose. The envelop or case is further provided toward one end with registering openings, 3 and 4, in its front and rear walls which are so located as to be brought directly in front of the eye when the notch 2 is engaged over the nose. The opening in one wall is covered by a test lens, 5, which is suitably secured to the wall of the envelop. Attached to the lower edge of the envelop directly below the lens is a flexible scale measure or tape, 6, having thereon a series of numbers or other indices. This tape is passed through slots, 7, 8, 9, in a test card, 10, having test type on its face as indicated at 11, so that the numbers on the tape may be read between the slots 8 and 9.

12 designates a card placed within the envelop and provided with a slot 13 which will register with the lens 5 when the device is in use. This card is to be used when testing the eyes for astigmatism and is provided with a number of slots corresponding to different meridians and arranged to extend across the optical center of the lens. Assuming that the astigmatism card is in the envelop or case, the envelop is placed in position on the nose with the lens directly in front of one eye, the other eye being obscured by the opposite end of the envelop. The test card 10 is then caused to slide along the tape until it has been determined at what point the test type appears clearest. The number on the tape which then appears between the upper two slots of the test card 10 will denote the power of the lens required for the correction of the particular meridian indicated by the card 12. In testing for hyperopia, myopia or presbyopia, the device is used in the same manner but the meridian card is first removed from the envelop or case. After one eye has been tested, the case is reversed so as to bring the test lens in front of the other eye which is then tested. When the device is not in use or is to be forwarded to a customer, the scale measure may be wrapped around the test card and the cards all placed in the envelop. The device is exceedingly simple in its construction and use and its advantages are thought to be obvious.

Having thus described my invention, what I claim and desire to secure by Letters-Patent is:—

1. Means for testing the eyes comprising a case or pocket constructed to obscure one eye, a test lens in the case arranged to be brought in front of the other eye, a flexible measure attached to the lower edge of the case in line with said lens, and a test card slidably mounted on the measure, the measure and the card being adapted to be stored in the case when not in use.

2. Means for testing the eyes comprising a case or envelop shaped to fit the nose, a test lens in one end of the same, a measure attached to the envelop, a test card slidably fitted on the measure, and a removable card within the envelop provided with a slot arranged to extend across the center of the lens.

In testimony whereof I affix my signature, in the presence of two witnesses.

GUSTAVUS ADOLPHUS BAHN.

Witnesses:
A. BASNETT,
O. MONFORT.